United States Patent [19]
Karwinski

[11] 3,731,434
[45] May 8, 1973

[54] GRINDING MACHINE

[75] Inventor: Gerhard E. Karwinski, Mount Prospect, Ill.

[73] Assignee: CTR, Inc., Elk Grove Village, Ill.

[22] Filed: Apr. 12, 1971

[21] Appl. No.: 133,224

[52] U.S. Cl. ............................. 51/95 LH, 51/105 R
[51] Int. Cl. ............................................. B24b 3/26
[58] Field of Search ............ 51/95 LH, 95 R, 95 WH, 51/95 TG, 97 R, 105 R, 165.8, 165.89, 165.9, 232, 288

[56] References Cited

UNITED STATES PATENTS

| 2,792,676 | 5/1957 | Umbdenstock | 51/95 LH |
|---|---|---|---|
| 2,585,986 | 2/1952 | Andreasson | 51/95 LH |
| 2,212,855 | 8/1940 | Chittenden | 51/95 LH |
| 1,718,193 | 6/1929 | De Vlieg | 51/95 LH |
| 3,429,195 | 2/1969 | Bassoff | 51/95 R X |

*Primary Examiner*—Donald G. Kelly
*Attorney*—Stone, Zummer & Aubel

[57] ABSTRACT

A grinding machine for forming a helical cutting surface on a tool, especially a tool such as a stepped twist drill. The grinding machine generally includes a rotary grinding wheel, which grinding wheel is fixedly positioned relative to a frame, and a table movably mounted on the frame adjacent to the grinding wheel. A power source rotatably drives a drive shaft mounted on the table. The power source is connected through the drive shaft to an epicyclic-gear train also mounted on the table. A drive housing is pivotedly mounted on the table, with a work piece drive shaft slideably and rotatably mounted in the drive housing. The work piece drive shaft is driven by the epicyclic-gear train. Connected to the work piece drive shaft is a work piece holder, which supports a work piece in position for engagement with the grinding wheel. The epicyclic-gear train is connected to a control device for controlling movement of the work piece relative to the grinding wheel to generate a helical surface on the work piece as the work piece is carried by the table past the grinding wheel. A cam shaft is driven by the power source, and the cam shaft's rotation is synchronized with that of the drive shaft. A first cam affects axial movement of the work piece drive shaft and the work piece relative to the grinding wheel, and a second cam on the cam shaft regulates pivotal movement of the drive housing to affect the peripheral engagement of the work piece with the grinding wheel to affect the depth of the cut to be taken in the work piece by the grinding wheel.

20 Claims, 9 Drawing Figures

INVENTOR
GERHARD E. KARWINSKI

INVENTOR
GERHARD E. KARWINSKI

GRINDING MACHINE

BACKGROUND OF THE INVENTION

Various tools are ground periodically for various reasons. In certain tools, such as, twist drills, it has been found to be desirable to grind the front or forward portion of the twist drill to a reduced size so that the drill is a stepped drill and may be used as a centering drill in certain high-production operations. A common method for making a stepped drill is by reducing the size of an ordinary twist drill at its front end in a three-step operation. The drill is ground down to define the margin, and then the land is ground. The third operation is to grind a bevel at the end of the reduced portion so that there is no sharp drop-off between the larger and smaller portions of the twist drill.

In order to reduce the number of operations which are required to grind such a work piece, a number of grinding machines are provided which solve some of the problems. One of such machines is shown in U.S. Letters Pat. No. 2,792,676. One of the principal problems with a machine of this type is that the machine does not provide a constant width true helical margin, which is required of a fine twist drill.

SUMMARY OF THE INVENTION

The present invention relates to a grinding machine which has a rotary grinding wheel fixed in one position. The rotary grinding wheel has mounted adjacent thereto a table which moves relative to the grinding wheel to carry a work piece past the grinding wheel. The table has mounted thereon a power source which drives simultaneously a drive shaft and a cam shaft so that the rotation of the drive shaft and the cam shaft is synchronized. The drive shaft drives a work piece drive shaft through an epicyclic-gear train mounted on the table. The epicyclic-gear train is connected to a control device which includes a straight edge fixed relative to the table. A follower mounted on the table engages the straight edge and is connected to the epicyclic-gear train so that as there is movement of the table in one direction, the work piece drive shaft has its position relative to the grinding wheel affected by a straight edge fixed exteriorally of the table to determine a true helix on the surface of the work piece. A first cam is mounted on the cam shaft for moving the drive shaft axially for the proper axial positioning of the work piece relative to the grinding wheel. A second cam mounted on the cam shaft positions peripherally the work piece in conjunction with the axial movement relative to the grinding wheel to grind a margin and a land on the work piece.

It is therefore a principal object of the present invention to provide a grinding machine capable of cutting a true helical surface with a constant width margin on a twist drill.

It is a further object of the instant invention to provide a grinding machine which will cut a margin, a land and a bevel between steps of a stepped twist drill in one operation.

It is a still further object of this invention to provide a grinding machine which may be easily set up and adjusted.

It is still another object of the herein-disclosed invention to provide a grinding machine which has a high degree of stability.

It is a still further object of the present invention to provide a grinding machine which is capable of generating a wide range of helical surfaces.

Other objects and uses of the present invention will become readily apparent to those skilled in the art upon a perusal of the following specification in light of the accompanying drawings.

DESCRIPTION OF THE PREFERRED EMBODIMENT

Figure 1:
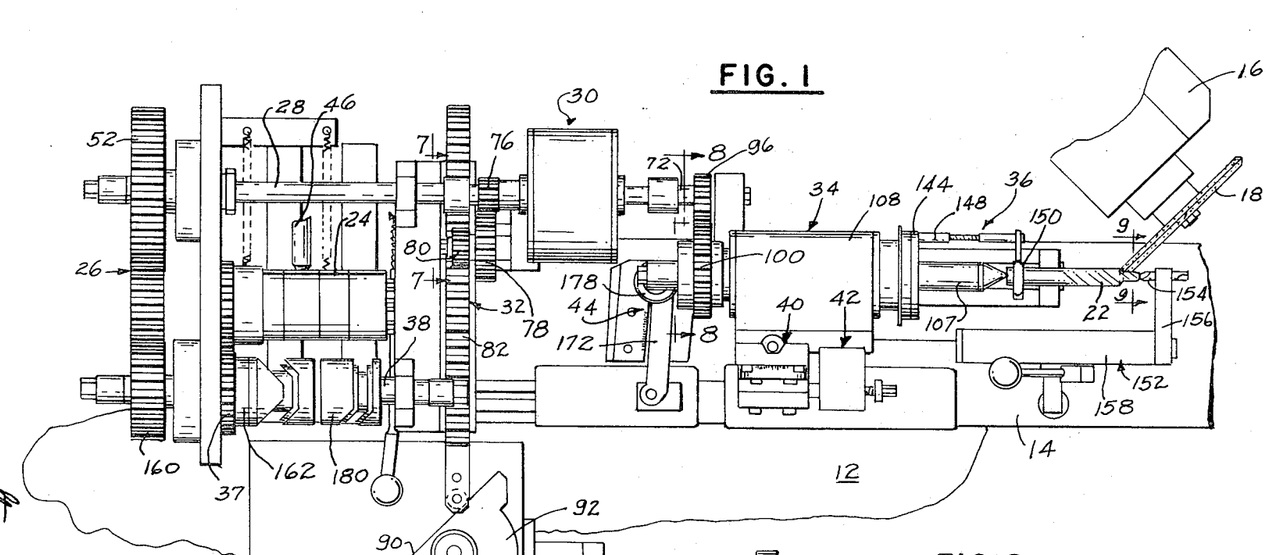
FIG. 1 is a plan view of a portion of a grinding machine, showing a specific embodiment of the present invention.
Figure 2:
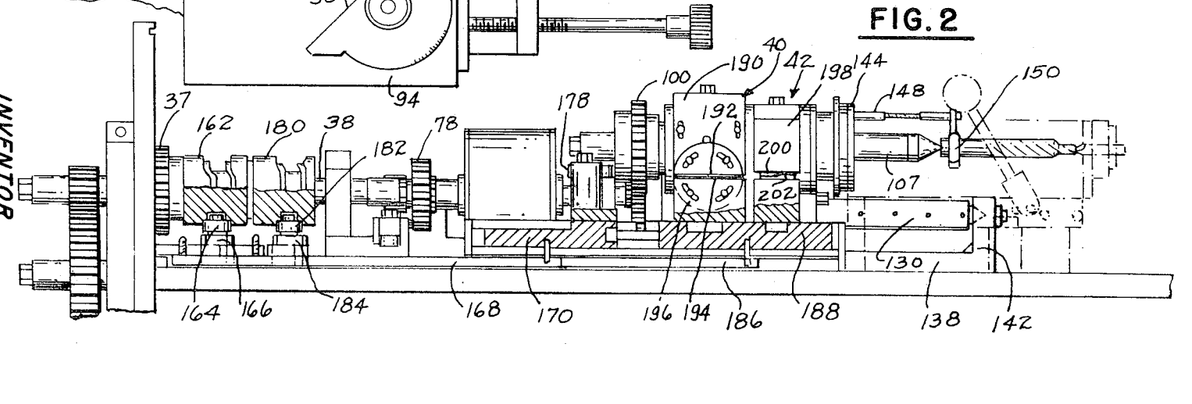
FIG. 2 is a side elevational view of a portion of the grinding machine shown in FIG. 1, with the grinding wheel removed, portions broken away in order to show better the interrelationship of certain of the parts and portions shown in phantom view in order to show clearly other portions of the invention.

Referring now to the drawings, and especially to FIG. 1, a grinding machine embodying the present invention is generally indicated by numeral 10. The grinding machine 10 generally includes a frame 12 (shown only partially herein), a table 14 movably mounted on the frame, and a grinding head 16 fixed to the frame 12. The grinding head 16 includes a grinding wheel 18, which is rotatably mounted on the grinding head. A work piece operator 20 is mounted on the table 14 and controls the position of a work piece 22, which in this instance is a stepped two flute twist drill, relative to the grinding wheel 18 for grinding specific surfaces on the work piece.

The table 14 is conventional in its construction in that it moves on the frame 12 relative to the grinding head 16 by a conventional and well-known drive (which is not shown herein). The specific improvement in this grinding machine lies in the work piece operator 20, which appropriately positions the work piece 22 relative to the grinding wheel 18 to cut a helical cutting edge into the work piece.

The work piece operator 20 generally includes a fluid motor 24 mounted on the table 14, which fluid motor is connected to a gear drive 26. The gear drive is connected to a drive shaft 28, which in turn is connected to an epicyclic-gear train 30. The epicyclic-gear train is controlled by a carrier control 32. The epicyclic-gear train is connected to a work piece drive 34, which is in turn drivingly connected to a work piece holder 36. The gear drive 26 is connected to the fluid motor through a power gear 37 mounted on a cam shaft 38. The cam shaft 38 is connected to a pair of cam assemblies 40 and 42 which affect the position of the drive 34 relative to the grinding wheel in cooperation with an axial operator 44.

The fluid motor 24 is a conventional fluid motor and is connected to a source of fluid under pressure by a pipe 46. The fluid motor provides the basic power source for the work piece operator 20. The fluid motor drives simultaneously the drive shaft 28 and the cam shaft 38 through the gear drive 26.

Figure 3:
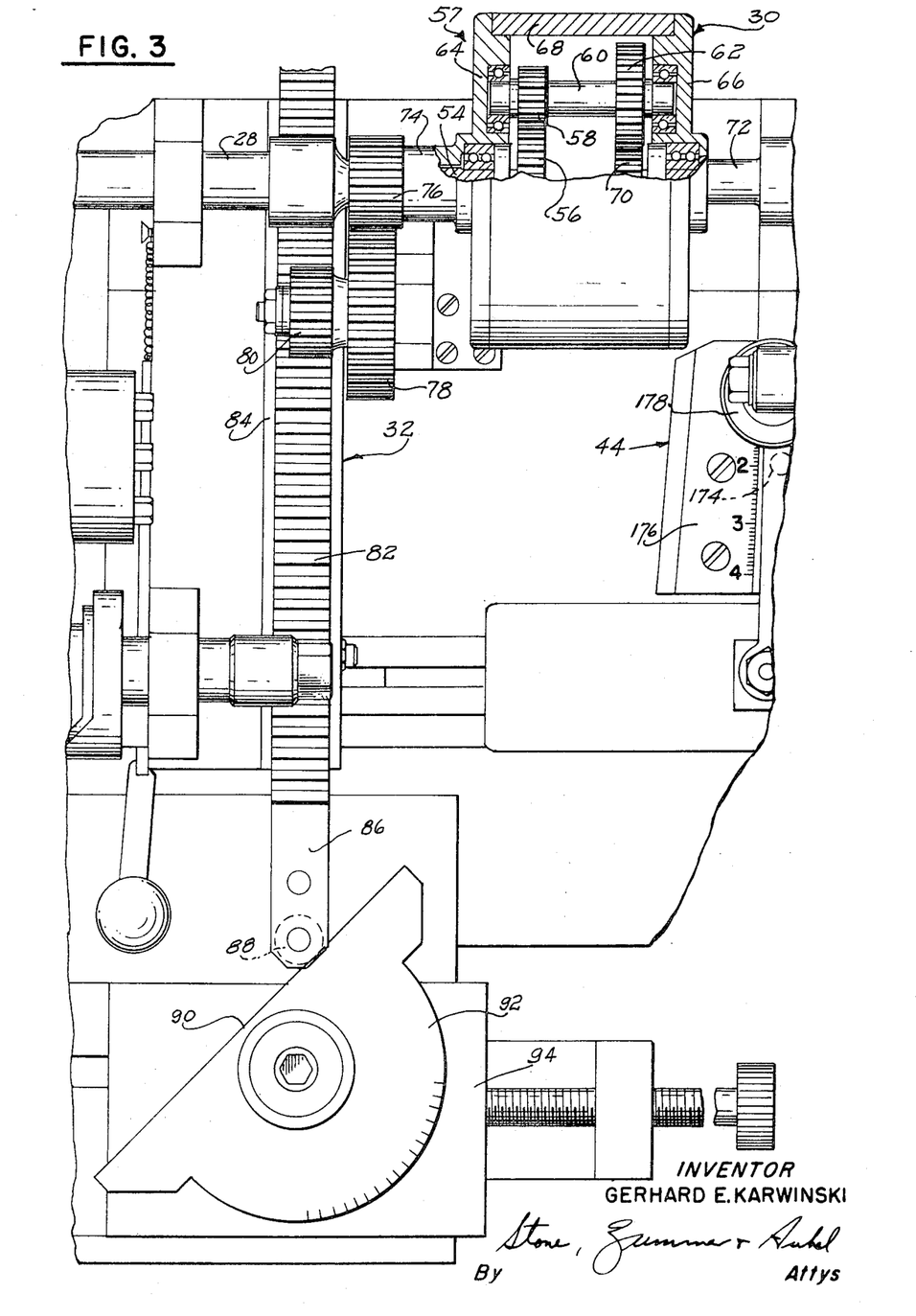
FIG. 3 is an enlarged plan view of a portion of the grinding machine shown in FIG. 1, showing a drive which is part of the present invention and a control for the drive, with a portion of an epicyclic-gear train of the drive shown in cross-section to show the interrelationship of certain of the parts, especially the gears and carrier of the epicyclic-gear train.

Looking now to FIGS. 1 and 3, it may be seen that the drive shaft 28 is connected at one end to a drive shaft gear 52, which is part of the gear drive 26, and the other end is connected to a sun gear shaft 54. A drive sun gear 56 is mounted on one end of the sun gear shaft 54 within a housing 57. A plurality of drive planetary gears 58 mesh with the sun gear 56 within housing 57, although only one of the planetary gears is shown in FIG. 3. Each of the planetary gears 58 is fixed to a respective planetary gear shaft 60, to which is fixed a second planetary gear 62. Each of the planetary gear shafts 60 is rotatably mounted in carrier side walls 64 and 66 of housing 57. The side walls 64 and 66 act as carriers for the planetary gears. The housing has an outer shell 68, which is sealingly fixed to the side walls. Each of the second planetary gears 62 mesh with a second sun gear 70, which is drivingly connected to a second sun gear shaft 72.

The carrier control 32 is drivingly connected to the carrier side wall 64. The side wall 64 has a short, hollow shaft 74 fixed thereto, in which the sun gear shaft 54 is rotatably mounted. Fixed to the hollow shaft 74 is a shaft gear 76, which meshes with a gear 78. The gear 78 is fixed to a rack gear 80, which meshes with a rack 82. The rack 82 is slideably mounted in a slide 84 on table 14. The rack has a follower extension 86 extending from one end. A follower 88 is rotatably mounted on the extension 86 and is engageable with a straight edge 90. The straight edge 90 is formed integral with a head 92, which head is rotatably mounted on a head block 94, which head block is fixed to the frame 12. It may be appreciated that as the table 14 moves axially relative to the drive shaft 28, the follower 88 moves among the straight edge 90 to rotate the carrier side wall 64, and thus move the planetary gears 58 relative to the sun gear 56 and move the planetary gear 62 relative to the sun gear 70, thereby affecting the rotation of shaft 72. It is apparent that the angular position of the straight edge 90 determines the rate of movement of the shaft 72.

Figure 8:
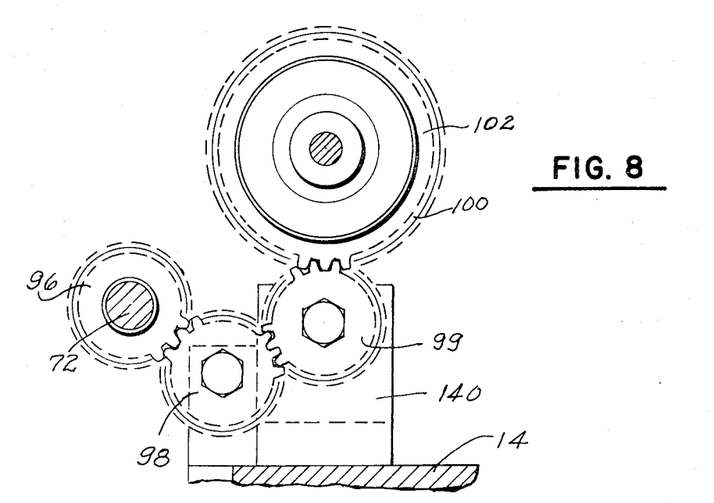
FIG. 8 is a cross-sectional view taken on Line 8—8 of FIG. 1, showing the gear drive for a work piece drive shaft.

The shaft 72 is drivingly connected to the work piece drive 34. Looking now to FIGS. 4 and 8, it may be seen that the sun gear shaft 72 is drivingly fixed to a pinion 96. The pinion 96 meshes with an idler gear 98, which in turn meshes with a center gear 99. The center gear meshes with a drive shaft gear 100. As may be best seen in FIG. 5, the drive shaft gear 100 is formed integral with a collar 102, which is fixed to a hollow work piece drive shaft 104. The work piece drive shaft 104 has a flange 106 formed integral therewith, and a dead center 107 is mounted in the shaft 104. The work piece drive shaft is rotatably and slideably mounted in a work piece drive housing 108. The work piece drive housing includes a body 110 having a drive cap 112 sealingly fixed on one end thereof. The cap 112 rotatably, slideably and sealingly engages the work piece drive shaft 104. A work piece cap 114 is sealingly fixed to the other end of the body 110. The cap 114 also rotatably, slideably and sealingly engages the work piece drive shaft 104. The work piece drive shaft 104 has a groove 116 therein, with a lock ring 118 mounted in the groove. A stop ring 120 is mounted in engagement with the lock ring 118. A spring 122 is mounted in the space between the work piece drive shaft 104 and the interior of the body 110. One end of the spring 122 engages the stop ring 120, and the other end engages a ring 124, which has a seal 126 mounted between the ring 124 and the end of cap 114. A bearing sleeve 128 is mounted in engagement with the flange 106 and is in sliding and stopping engagement with the cap 114.

Figure 5:
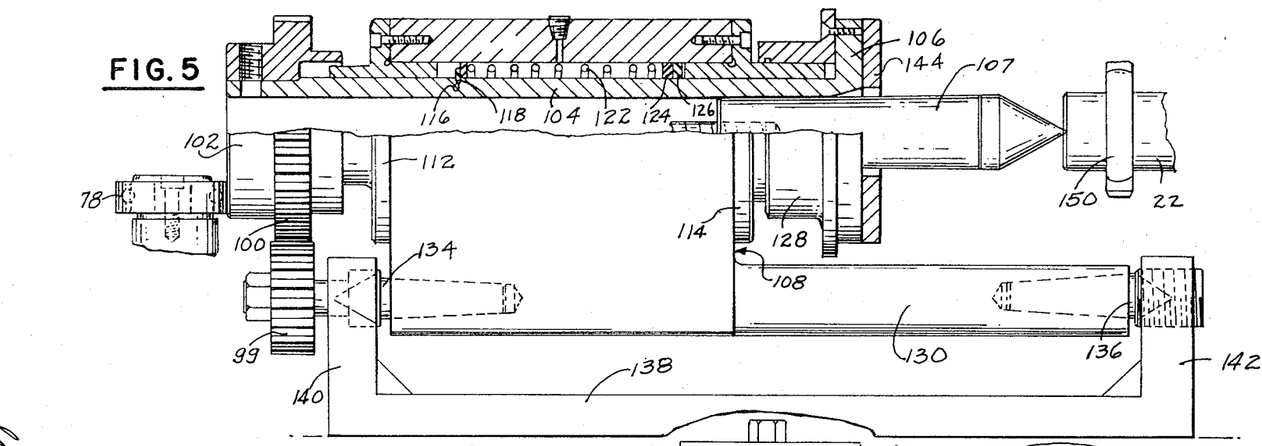
FIG. 5 is a side elevational view of a work piece drive shaft housing, with a portion broken away in order to show better the construction thereof.

The work piece drive 34 also has a pivot extension arm 130 extending from the body 110. A pivot center 134 is mounted in the body 110, and a pivot center 136 is mounted in the arm 132. A pivot yoke 138 is fixed to the table 14 and has a pair of arms 140 and 142 extending upward, which arms 140 and 142 pivotedly receive the pivot centers 134 and 136 to allow the body to pivot about the centers. It is important to note that the center of gear 99 is coincidental with the axis of pivoting so that the housing may pivot and still keep gear 100 in mesh with gear 99.

Figure 4:
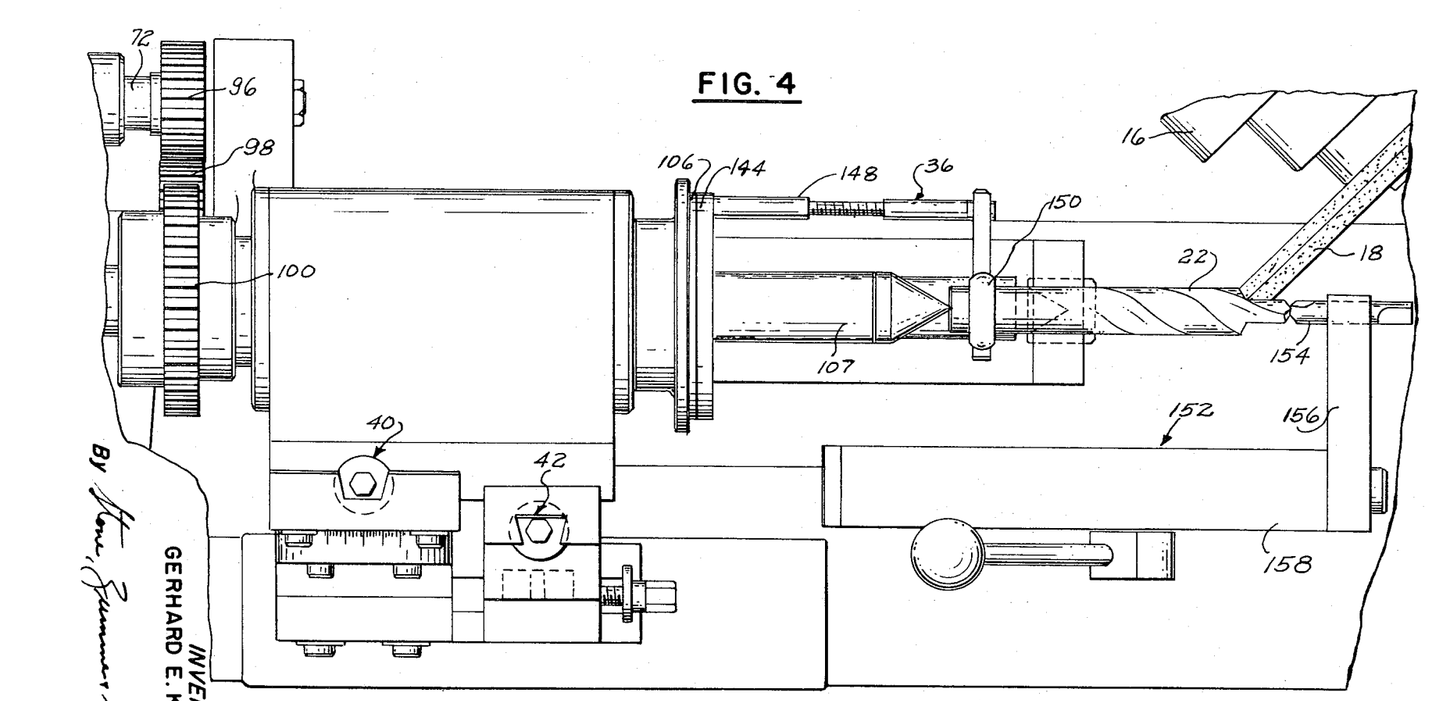
FIG. 4 is an enlarged plan view of a work piece operator, which is part of the grinding machine shown in FIG. 1, shown connected to a work piece holder and a work piece positioned in the work piece holder.

As may be seen in FIG. 4, the work piece holder 36 is attached to the flange 106. The work piece holder includes an annular plate 144, which is fixed to the flange 106 around center 107. An adjustable post 148 has one end fixed to the plate 144 and the other end of the post is fixed to a vise 150, which vise has its center aligned with the center 107. The work piece 22, which in this instance is a stepped twist drill, has its center positioned in the end of the center 107 and gripped in the vise 150 to be rotated thereby. A point holder 152 includes a receptacle 154, which receives the point of the work piece. The receptacle 154 is mounted on an arm 156, which is supported by and axially positionable by a conventional and well-known arm control mechanism 158.

As was mentioned above, the cam shaft 38 is drivingly connected to the fluid motor 24 through the gear drive 26. A cam shaft drive gear 160, which is part of the gear drive 26, is fixed to the cam shaft 38. It may be appreciated that the rotation of the drive shaft 28 and the cam shaft 38 is interconnected and synchronized since they are interconnected by the gear drive. Fixed to the cam shaft 38 is a first cam 162, with a follower 164 engaging the cam. The follower 164 is mounted on a base 166, which is connected to a first cam rod 168. The first cam rod is axially movable by the cam and is connected to a slideable block 170, which in turn is connected to an adjustable arm 172 of the axial operator 44. The arm is connected to a pivot pin 174, which pivot pin may be moved along a pivot positioning block 176. A drive wheel 178 is rotatably mounted on the end of the arm 172, which wheel 178 is rotatably engageable with the collar 102 to displace the work piece drive shaft axially against the spring 122. It may be appreciated that the amount of displacement of the wheel, and thus the displacement of the drive shaft, is regulated by appropriately positioning the pivot pin 174 relative to the block 176 and the arm 172.

A second cam 180 is mounted on the cam shaft 38. A second cam follower 182 engages the cam 180, and the second cam follower is mounted on a second base 184. The second base is connected to a second cam rod 186, which is slideable relative to the table and is connected to a carrier 188. The carrier 188 is connected to the first and second cam assemblies 40 and 42. Cam assembly 40 includes an upper cam face holder 190, which is fixed to the body 110. A slide cam face 192 is fixed to the upper head 190, and a mating second slide cam face 194 slideably engages the first cam face 192. A lower cam face carrier 196 supports the second cam face 194 and is connected to the carrier 188. It may be appreciated that the cam assembly 40 is adjustable relative to the housing to regulate the slope of the margin formed.

Figure 6:
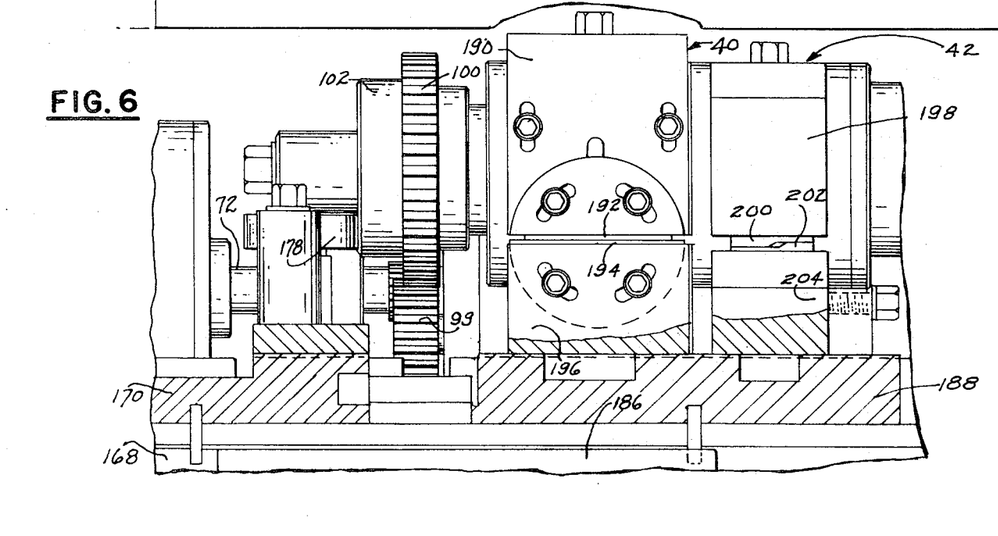
FIG. 6 is an enlarged side elevational view of a pair of slide cams which pivot the work piece drive shaft housing.
Figure 7:
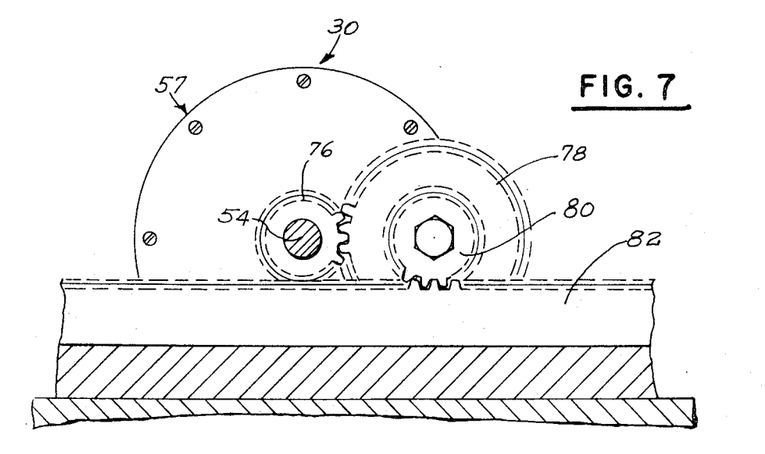
FIG. 7 is an enlarged cross-sectional view taken on Line 7—7 of FIG. 1, showing the interrelationship of various gears of the control for the drive.

In like manner, the second cam assembly 42 has an upper cam face holder 198, which is fixed to the housing 110. An upper slide cam face 200 is adjustably secured to the upper cam face housing, and a mateable lower slide cam face 202 engages the upper cam face. The cam faces 200 and 202 each have a step, which is best seen in FIG. 6. The steps in the cam faces are spaced apart the required width of the margin. The lower cam face 202 is adjustably secured to a lower cam face carrier 204, which is fixed to the carrier 188.

The work piece 22 is loaded in the work piece holder 36 by placing the work piece into vise 150. The work piece in the work piece holder 36 is operatively positioned by mounting the plate 144 in driving connection with the flange 106. The center 107, which is fixed to the drive shaft 104, centers the work piece. The other end of the work piece is centered in the receptacle 154. The receptacle 154 is positioned by moving the arm 156 relative to the work piece. The operator adjusts the angular position of the edge 90 in order to make certain that the grinding wheel 18 follows the helix of the flutes of the work piece. It may be appreciated that inasmuch as the table 14 moves in a straight line relative to the grinding wheel and the control for determining the angle of the helix is also a straight line at an angle to the direction of movement, a perfect helical surface is generated in view of the fact that two straight lines are used. Furthermore, any operative helix angle may be generated by the instant device.

The fluid motor drives the gear drive so that the drive shaft 54 drives the sun gear 56, which in turn drives the planetary gear 58, and the planetary gear 62 drives the sun gear 70, which in turn rotates the shaft 72, which is drivingly connected to the gear 100. The gear 100 rotates the work piece drive shaft 104 so that the work piece is rotated relative to the grinding wheel. It should also be noted that the grinding wheel is, of course, rotating; and the table 14 is moving axially, that is, relative to the axis of the work piece.

Figure 9:
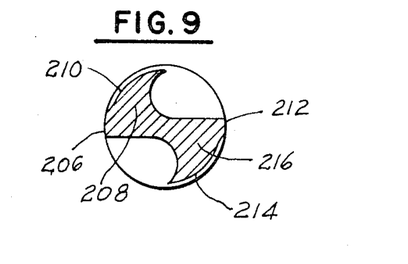
FIG. 9 is a cross-sectional view, showing a cross-section of the work piece, taken on Line 9—9 of FIG. 1.

The grinding wheel engages the work piece to grind the required surface. As the work piece rotates, simultaneously the cam shaft 38 is also rotating in conjunction with the drive shaft 28. The cam 162 rotates to move the work piece forward and into engagement with the grinding wheel through the interaction of the adjustment arm 172 and the related parts. The forward motion of the work piece drive shaft 104 is against the force of spring 122 and is limited by the collar 102. Simultaneously, the cam 180 is rotating with the cam 162. The rotation of cam 180 causes the interaction of the slide cams of cam assemblies 40 and 42 to pivot the housing 110 and work piece toward the grinding wheel to increase the depth of the cut of the grinding wheel. Initially, the cam faces 192 and 194 interact to pivot the housing slightly, during which time a margin 206 (shown in FIG. 9) is ground on a rib 208. Further rotation of cam 180 places the steps of cam faces 200 and 202 into contact to pivot further the housing and cause the work piece to be moved into the grinding wheel for a deeper cut, thereby forming a land 210. It should be noted that the step from the margin 206 to the land 210 is not a sharp step, but rather a broad fillet which improves the strength of the margin. When the grinding wheel reaches the end of rib 208, cam 162 releases the arm 172 so that spring 122 retracts the work piece. Further rotation of the cams 162 and 180 appropriately positions the work piece for formation of margin 212 and land 214 of rib 216 in the manner described above for margin 206 and land 210. While a cut is being made as described above, the table 14 is being moved slightly forward. Thus, the follower 88 moves up along the straight edge 90 to push in the rack 84, thereby rotating the gears 76 and 78 to rotate slightly the carrier of the planetary gear and thereby rotating the work piece slightly relative to the action of the cams and thus achieving perfect helical surfaces on the work piece so that the margins 206 and 212 each have a constant width over their respective lengths.

It should be noted that this device is particularly adapted for grinding a reduced size drilling surface on a twist drill to make a stepped drill or rework a stepped drill. The present device performs three functions simultaneously. First, the margin is formed. Second, a land is almost simultaneously formed. In passing, it should be noted that there is a fillet between the margin and the land, thereby avoiding the point of stress concentration and prolonging the drill life. The third function is that the drill is stepped, with a slope or bevel between the larger and the smaller sizes. There is only one cut necessary to complete the drill, thereby completing the work piece in one simple operation.

Although the specific disclosure shown and described above grinds a helical surface having a right-hand twist, it is readily apparent that the instant device can be adapted to grind a left-hand twist by the appropriate addition of gears and the modification of the cams. All of these modifications are readily apparent to one skilled in the art.

Although a specific embodiment of the herein-disclosed invention has been described in detail above, it may be appreciated that those skilled in the art may make other modifications and changes in the specific grinding machine disclosed above without departing from the spirit and scope of the present invention. It is to be expressly understood that the instant invention is limited only by the appended claims.

What is claimed is:

1. A grinding machine comprising, a rotary grinding wheel, a table movably mounted adjacent to the grinding wheel, a power source, a drive shaft mounted on the table and drivingly connected to the power source to be driven thereby, an epicyclic-gear train mounted on the table and being drivingly connected to the drive shaft, a work piece drive shaft rotatably mounted on the table and being drivingly connected to the output of the epicyclic-gear train, a cam shaft drivingly connected to the power source and being geared to the drive shaft for driving interconnection therewith, a first cam mounted on the cam shaft and being connected to the work piece drive shaft for selectively moving the work piece drive shaft axially relative to the grinding wheel, a second cam mounted on the cam shaft for selectively moving the work piece drive shaft relative to the grinding wheel to affect the depth of cut of the grinding wheel, and a control device having a first portion fixed and a second portion movable relative to the first portion and being connected to the epicyclic-gear train for affecting the rotation of the work piece drive shaft.

2. A grinding machine as defined in claim 1 wherein the epicyclic-gear train includes a sun gear connected to the drive shaft, a first planetary gear meshing with the sun gear, a second planetary gear connected to the first planetary gear for rotation therewith, a carrier rotatably supporting the planetary gears, and a second sun gear meshing with the second planetary gear, said second sun gear being drivingly connected to the work piece drive shaft, said carrier being connected to the second portion of the control device.

3. A grinding machine as defined in claim 1, including a first cam rod connected to the first cam and to the work piece drive shaft for moving the work piece drive shaft axially relative to the grinding wheel to position axially the work piece drive shaft relative to the grinding wheel, and a second cam rod connected to the second cam and to the work piece drive shaft for positioning the work piece drive shaft relative to the grinding wheel to affect the depth of cut of the grinding wheel.

4. A grinding machine as defined in claim 1, including a second cam rod connected to the second cam and to the work piece drive shaft for pivoting the work piece drive shaft relative to the grinding wheel.

5. A grinding machine as defined in claim 1, including a first cam rod connected to the first cam and to the work piece drive shaft for moving the work piece drive shaft axially to position selectively the drive shaft relative to the grinding wheel.

6. A grinding machine comprising, a rotary grinding wheel, a table movably mounted adjacent to the grinding wheel, a work piece drive shaft rotatably mounted on the table and being adapted for connection to a work piece, an epicyclic-gear train mounted on the table for movement therewith, said epicyclic-gear train having an output shaft drivingly connected to the work piece drive shaft, a power source drivingly connected to the epicyclic-gear train, and means connected to the epicyclic-gear train to control the rotation of the output shaft in response to the position of the table relative to the grinding wheel.

7. A grinding machine as defined in claim 6, including a cam drivingly connected to the power source, said cam being connected to the work piece drive shaft for moving the work piece drive shaft relative to the grinding wheel to affect the depth of cut of the grinding wheel.

8. A grinding machine as defined in claim 7, including a slide cam and a rod connected to the first-mentioned cam, said slide cam being connected to the work piece drive shaft for moving the work piece drive shaft relative to the grinding wheel.

9. A grinding machine as defined in claim 6, including a housing pivotedly mounted on the table and slideably and rotatably receiving the work piece drive shaft, a cam connected to the power source, said cam being connected to the work piece drive shaft for moving the shaft axially, and said epicyclic-gear train includes a first sun gear drivingly connected to the power source, a first planetary gear meshing with the first sun gear, a second planetary gear drivingly fixed to the first planetary gear, a carrier rotatably supporting the planetary gears, said carrier connected to the means connected to the epicyclic-gear train to control the rotation of the output shaft, and a second sun gear meshing with the second planetary gear, said second sun gear being drivingly connected to the work piece drive shaft.

10. A grinding machine as defined in claim 9, including a second cam drivingly connected to the first-mentioned cam for rotation therewith, a slide cam drivingly connected to the second cam, said slide cam being connected to the work piece drive shaft for pivoting the work piece drive shaft relative to the table to position the work piece drive shaft relative to the grinding wheel.

11. A grinding machine as defined in claim 6 wherein the epicyclic-gear train includes a drive sun gear drivingly connected to the power source, a first planetary gear meshing with the drive sun gear, a second planetary gear drivingly connected to the first planetary gear for rotation therewith, a carrier rotatably supporting the planetary gears and being movable about the drive sun gear, and an output sun gear meshing with the second planetary gear and being drivingly connected to the work piece drive shaft, said means connected to the epicyclic-gear train, including a straight edge fixed relative to the grinding wheel and being angularly adjustable relative to the direction of movement of the table, and a follower engageable with the straight edge and being connected to the carrier.

12. A grinding machine as defined in claim 6 wherein the means connected to the epicyclic-gear train to control the rotation of the output shaft includes a straight edge fixed relative to the rotary grinding wheel, and a follower movably mounted on the table and engageable with the straight edge, said follower being connected to the epicyclic-gear train.

13. A grinding machine as defined in claim 6, including a cam drivingly connected to the power source, said cam being connected to a work piece for moving the work piece axially relative to the grinding wheel.

14. A grinding machine as defined in claim 6 wherein the epicyclic-gear train includes a sun gear drivingly connected to the power source, a first planetary gear meshing with the sun gear, a second planetary gear fixed to the first planetary gear for rotation therewith, a carrier rotatably supporting the first and second planetary gears, said carrier connected to the means connected to the epicyclic-gear train to control the rotation of the output shaft, and a second sun gear meshing with the second planetary gear and being drivingly connected to the work piece drive shaft, and including a drive housing pivotedly mounted on the table and rotatably receiving the work piece drive shaft, a cam drivingly connected to the power source, a slide cam and rod connected to the cam, said slide cam being connected to the drive housing for pivoting the drive housing relative to the grinding wheel.

15. A grinding machine as defined in claim 6, including a cam shaft drivingly connected to the power source and being drivingly connected to the epicyclic-gear train, a first cam mounted on the cam shaft and being connected to a work piece for moving the work piece axially relative to the grinding wheel, and a second cam mounted on the cam shaft and being connected to the work piece for moving the work piece relative to the grinding wheel to affect the depth of the cut in the work piece.

16. A grinding machine as defined in claim 6 wherein the epicyclic-gear train includes a sun gear drivingly connected to the power source, a first planetary gear meshing with the sun gear, a second planetary gear fixed to the first planetary gear, a carrier rotatably supporting the planetary gears, said carrier being connected to said means connected to the epicyclic-gear train to control the rotation of the output shaft, and a second sun gear meshing with the second planetary gear, said second sun gear being drivingly connected to the work piece drive shaft.

17. A grinding machine comprising, a frame, a rotary grinding wheel fixedly mounted relative to the frame, a table movably mounted on the frame adjacent to the grinding wheel, a power source mounted on the table, a drive shaft rotatably mounted on the table and connected to the power source by gears, an epicyclic-gear train mounted on the table and having its input drivingly connected to the drive shaft, a work piece drive housing pivotedly mounted on the table adjacent to the grinding wheel, a work piece drive shaft rotatably mounted in the work piece drive housing and being adapted for connection to a work piece, said work piece drive shaft being drivingly connected to the output of the epicyclic-gear train, a control member fixed to the frame, a control device engageable with the control member and being connected to the epicyclic-gear train for controlling the output of the epicyclic-gear train to position angularly the work piece drive shaft in response to its axial position relative to the rotary grinding wheel, a cam shaft rotatably mounted on the table and being connected to the power source and to the drive shaft, a first cam mounted on the cam shaft, a first cam rod connected to the cam shaft and to the work piece drive shaft for moving the drive shaft axially in the housing for selectively positioning the drive shaft relative to the grinding wheel, a second cam mounted on the cam shaft, and a second cam rod connected to the cam shaft and being connected to the housing for pivoting the housing with the work piece drive shaft relative to the table and relative to the grinding wheel.

18. A grinding machine as defined in claim 17 wherein the epicyclic-gear train includes an input sun gear connected to the drive shaft, a first planetary gear meshing with the input sun gear, a second planetary gear drivingly fixed to the first planetary gear, an output sun gear meshing with the second planetary gear and being drivingly connected to the work piece drive shaft, and a carrier rotatably supporting the planetary gears and being connected to the control device for rotation thereby to rotate the planetary gears about their respective sun gears.

19. A grinding machine as defined in claim 18, including a first slide cam connected to the second cam rod for pivoting slightly the housing, and a second slide cam connected to the second cam rod for pivoting the housing a greater amount after initial movement by the first slide cam.

20. A grinding machine as defined in claim 17, including a first slide cam connected to the second cam rod for pivoting slightly the housing, and a second slide cam for pivoting the housing a greater amount after initial movement by the first slide cam.

* * * * *